US011245305B2

(12) United States Patent
Vohlgemuth

(10) Patent No.: US 11,245,305 B2
(45) Date of Patent: Feb. 8, 2022

(54) ROTARY ELECTRIC MACHINE HAVING WEDGES TO SUPPORT SALIENT POLES OF A ROTOR

(71) Applicant: MOTEURS LEROY-SOMER, Angouleme (FR)

(72) Inventor: Patrick Vohlgemuth, Anais (FR)

(73) Assignee: MOTEURS LEROY-SOMER, Angouleme (FR)

( * ) Notice: Subject to any disclaimer, the term of this patent is extended or adjusted under 35 U.S.C. 154(b) by 57 days.

(21) Appl. No.: 16/656,857

(22) Filed: Oct. 18, 2019

(65) Prior Publication Data

US 2020/0127525 A1  Apr. 23, 2020

(30) Foreign Application Priority Data

Oct. 19, 2018  (FR) ..................................... 1859679

(51) Int. Cl.
*H02K 3/52* (2006.01)
*H02K 1/24* (2006.01)
(Continued)

(52) U.S. Cl.
CPC ............... *H02K 3/527* (2013.01); *H02K 1/24* (2013.01); *H02K 1/16* (2013.01); *H02K 1/26* (2013.01);
(Continued)

(58) Field of Classification Search
CPC .. H02K 1/16; H02K 1/24; H02K 1/26; H02K 1/34; H02K 1/345; H02K 3/48;
(Continued)

(56) References Cited

U.S. PATENT DOCUMENTS 2,720,605 A 10/1955 Herd
6,791,230 B2* 9/2004 Tornquist ............... H02K 3/527
310/214

(Continued)

FOREIGN PATENT DOCUMENTS

EP 1983635 A2 10/2008
EP 1983635 A3 10/2012
(Continued)

*Primary Examiner* — Tulsidas C Patel
*Assistant Examiner* — Rashad H Johnson
(74) *Attorney, Agent, or Firm* — Shumaker, Loop & Kendrick

(57) ABSTRACT

A rotary electric machine including a rotor having salient poles, each salient pole comprising a pole body surrounded by at least one coil, and at least one pair of wedges comprising a first wedge positioned against the coil of a first salient pole and a second wedge positioned against the coil of a second salient pole consecutive with the first. The first and second wedges are able to move in the inter-pole space with respect to one another along the longitudinal axis of the rotor, and each having at least one contact surface, the contact surface or surfaces of the first wedge being configured to come into contact with the contact surface or surfaces of the second wedge as one wedge is moved longitudinally with respect to the other in such a way that the movement of one wedge with respect to the other induces a pressing of these wedges against the coils so as to hold the coils of the first and second salient poles respectively against the pole bodies of the first and second salient poles.

20 Claims, 2 Drawing Sheets

(51) Int. Cl.
  *H02K 3/487* (2006.01)
  *H02K 5/22* (2006.01)
  *H02K 15/00* (2006.01)
  *H02K 1/16* (2006.01)
  *H02K 1/26* (2006.01)
  *H02K 1/34* (2006.01)
  *H02K 3/48* (2006.01)

(52) U.S. Cl.
  CPC ................. *H02K 1/34* (2013.01); *H02K 3/48* (2013.01); *H02K 3/487* (2013.01); *H02K 5/22* (2013.01); *H02K 15/0018* (2013.01)

(58) Field of Classification Search
  CPC .......... H02K 3/487; H02K 3/52; H02K 3/521; H02K 3/522; H02K 3/527; H02K 15/0018
  USPC ................................ 310/156.38, 156.48, 214
  See application file for complete search history.

(56) References Cited

U.S. PATENT DOCUMENTS

| | | | | |
|---|---|---|---|---|
| 7,061,154 B2* | 6/2006 | McDowall | ............. | H02K 3/527 310/214 |
| 7,598,635 B2* | 10/2009 | Howard | ................... | H02K 1/32 310/61 |
| 7,786,630 B2* | 8/2010 | Waddell | ................. | H02K 1/325 310/58 |
| 2017/0163116 A1 | 6/2017 | Imura et al. | | |
| 2017/0338711 A1* | 11/2017 | Yu | ............................ | H02K 3/46 |
| 2019/0103777 A1* | 4/2019 | Pal | ............................ | H02K 1/28 |
| 2019/0372416 A1* | 12/2019 | Anghel | ................. | H02K 1/165 |

FOREIGN PATENT DOCUMENTS

| | | |
|---|---|---|
| FR | 2842666 A1 | 1/2004 |
| FR | 2894088 A1 | 6/2007 |
| FR | 2940867 A1 | 7/2010 |

* cited by examiner

ROTARY ELECTRIC MACHINE HAVING WEDGES TO SUPPORT SALIENT POLES OF A ROTOR

TECHNICAL FIELD AND BACKGROUND

The present invention relates to a rotor for a rotary electric machine, also referred to as a pole wheel, and, more specifically, although not exclusively, to an industrial alternator wound rotor.

The vast majority of industrial alternator rotors are wound rotors, which means to say rotors comprising windings of electric conductors (also referred to as induction coils) through which a dc current of variable current strength is intended to pass. Given the nature of the materials of the conductors, the radius of gyration at which they are mounted, and the rotational speed of the rotor, it is absolutely essential for these windings to be held firmly on the rotor.

Specifically, in such alternators, the rotor coils are subjected to centrifugal forces as the rotor rotates, these forces being all the higher the higher the diameter of the rotor and the rotational speed thereof. The components used to hold the coils along the body of the pole wheel are commonly referred to as "pole wheel wedges" or "rotor wedges".

Manufacturers use various shapes and various principles to perform this function of wedging the coils on the rotor. Some wedges are one-piece wedges, others are made up of several elements; some need to be supplemented by one or more clamping accessories of the nuts and bolts type, while others are force fitted.

Furthermore, the increase in the strength of the dc current passing through the coil leads to an increase in the heating within same. One of the design criteria of electric machines such as industrial alternators is the category of heating. This feature, associated with the operating temperature and the category of thermal withstand of the coil insulating materials govern the life of the machine's electrical insulation system.

The function of holding the conductors on the pole body is important in order to prevent them from being spun out, as mentioned hereinabove, but it is found that the pressure that the wedges exert on the coil is also a parameter of importance to the effectiveness of the cooling of the rotor.

Certain known shapes of wedge perform only the retention function. In that case, the quality of the exchange of heat between the coils and the rotor is fairly mediocre, and that leads to the use of a greater amount of active material (copper, iron and/or other conductors) in order to conform to a given thermal classification.

Publication FR 2 842 666 A1 discloses a rotor comprising salient poles having coils against which heat sinks that also act as wedges are firmly pressed by threaded rods.

During manufacture, the rods are tightened a first time when cold, then the rotor is placed in the oven. A further tightening is then performed while the machine is still hot, so as to increase the force with which the heat sinks are pressed against the coils and ensure good thermal contact. This second tightening operation entails handling of the machine that may prove tricky given its weight and size.

To simplify manufacture, the second tightening operation may be omitted, but the thermal contact is then not as good, which means that the coil has to be produced using more copper in order to reduce the strength of its current and therefore the extent to which it heats up in operation, and this has the disadvantage of increasing the cost of materials.

Other shapes of wedge apply pressure to the coil, but the principle on which they are designed does not make it possible to ensure good repeatability of the level of pressure in production. Overall, the quality of the heat exchange is better, but its variability from one machine to another remains great, and, once again, the optimization of the quantity of active material is not maximized.

For example, there are rotors in which tightness of clamping is achieved using Belleville spring washers. The presence thereof is liable to detract from the compactness of the machine and fitting them may prove difficult for certain rotor configurations. In addition, these washers are liable to lose their elasticity as the machine ages, thus reducing reliability or dictating more intensive maintenance.

Finally, there are wedges the pressure level of which can be mastered much better in production, contributing to a limited spread on the quality of the heat exchange. This control is one of the key factors in optimizing the quantity of active material in the rotor for a given level of heating. These are very often screw type systems which employ a significant number of components and, unfortunately, that makes creating the assembly more complicated and lengthens the operating times.

There is a need to simplify the manufacture of wound rotors without this simplification leading to an excessive impairment of the thermal performance or leading to an increase in the quantity of active material used in order to compensate for inferior heat transfer.

SUMMARY OF THE INVENTION

The present invention seeks to meet this need and according to one of its aspects one subject is thus a rotary electric machine comprising a rotor comprising:
  salient poles, each salient pole comprising a pole body surrounded by at least one coil,
  at least one pair of wedges comprising a first wedge positioned against the coil of a first salient pole and a second wedge positioned against the coil of a second salient pole consecutive with the first,
  the first and second wedges being able to move in the inter-pole space relative to one another, and each having at least one contact surface configured in such a way that the movement of one wedge with respect to the other induces a pressing of these wedges against the coils so as to hold the coils of the first and second salient poles respectively against the pole bodies of the first and second salient poles.

What is meant by an "inter-pole space" is the space defined between two consecutive poles.

The pair of wedges allows the coils to be held on the rotor and makes it possible to master the pressure that the wedges exert on the coils, without the addition of further components.

The first and second wedges may be able to move in the inter-pole space with respect to one another along the longitudinal axis of the rotor. When the pair of wedges is in place in the inter-pole space against the coils, all that is required is for the wedges to be moved relative to one another along the longitudinal axis of the rotor in order for them to exert the desired pressure on the coils.

The contact surface or surfaces of the first wedge may be configured to come into contact with the contact surface or surfaces of the second wedge as one wedge is moved longitudinally with respect to the other.

The contact surfaces of the first and second wedges may exhibit gradients with respect to the longitudinal axis of the rotor.

The angle of the gradients with respect to the longitudinal axis of the rotor may be less than the angle defining the cone of friction for grip of the material of which the wedges are made. That means that the wedges hold themself in position and do not relax their pressure after they have been tightened. This self-locking effect has a tendency to increase with the rotation of the rotor because, under the effect of centrifugal force, the more strongly the coils push on the wedges, the better the wedges are held in place in contact with one another.

The contact surfaces of the first and second wedges may be notched, and may notably comprise nonreturn reliefs. That makes it easier for the first and second wedges to maintain their relative longitudinal position, notably before the controlled tightening of these wedges.

The machine according to the invention may supply a power comprised for example between 10 and 2000 kW.

The rotor may comprise a number N of poles which is for example comprised between 4 and 16 or more.

The rotor for example comprises four, six, eight, ten, twelve, fourteen or sixteen poles or more.

The first and second wedges may be produced by casting and/or machining, preferably by injection molding.

The first and second wedge may be produced as single-piece components.

The first and second wedges may comprise, or even consist of, a metallic material, notably aluminum or an aluminum alloy, or an electrically insulating material, notably a thermoplastic or a reinforced thermoplastic. The use of an electrically insulating material means that it is possible not to need to resort to the use of an electrically insulating material placed, notably in the form of a thin sheet, between the wedges and the coils on which they are positioned.

The machine according to the invention may comprise an electrically insulating material, notably in the form of a thin sheet, placed between the wedges and the coils on which they are positioned. That makes it possible to electrically insulate the wedges from the coils, notably when the wedges comprise, or even consist of, a metallic material.

The first and second wedges may each comprise an inner part which is configured to press against the coil and an outer part which extends into the opening between two consecutive salient poles, these two parts meeting at one end, forming a, preferably acute, angle between them, and the contact surfaces being situated at the free ends of said parts.

The angle formed between the inner and outer parts at the end of the wedge may be substantially equal to half the angle formed between two consecutive poles, namely substantially equal to (½)×(360°/N), N being the number of poles of the rotor.

Each salient pole may comprise a pair of pole tips situated on either side of said salient pole, and the end of the wedge being configured to come to bear under the pole tips after the wedges have been mounted in the corresponding inter-pole space.

The inner part may comprise a body extending along a plane P and being prolonged by a protrusion that exhibits a break in gradient with the plane P, the protrusion exhibiting an upper surface.

The angle formed between the plane P and the protrusion may be substantially equal to half the angle formed between two consecutive poles, namely substantially equal to (½)×(360°/N), N being the number of poles of the rotor. The angle formed between the plane P and the protrusion and the angle formed between the inner and outer parts at the end of the wedge may be substantially equal.

The outer part may comprise a body comprising a flat defining a lower surface.

The first and second wedges may comprise collaborating reliefs contributing to guiding them in their movement relative to one another. That provides guidance in the direction parallel but also in the direction perpendicular to the direction in which one wedge moves with respect to the other (movement along the axis of rotation of the rotor).

The collaborating reliefs of one wedge may comprise tabs, notably tabs extending forward of the contact surfaces and positioned to slide on the upper face of the protrusion and the lower face of the flat of the other wedge during the longitudinal movement of the wedge with respect to the other one.

The inner and outer parts may be ribbed and comprise stiffening ribs.

The inner and outer parts of one wedge may each define contact surfaces for contact with the other wedge of the pair.

The first and second wedges may be identical and positioned top to toe in the inter-pole space.

The machine according to the invention may comprise, in each inter-pole space, several pairs of wedges distributed along the longitudinal axis of the rotor. It is possible to choose the extent to which the coils are held on the rotor by adapting the number of pairs of wedges distributed along the axis of the rotor in each inter-pole space.

The number of pairs of wedges distributed along the longitudinal axis of the rotor in each inter-pole space may be comprised between 1 and 5, preferably at least 2.

According to another of its aspects, another subject of the invention is an alternator comprising a rotor according to the invention, as defined above.

According to another of its aspects, a further subject of the invention is a method for manufacturing a rotor of a rotary electric machine, comprising salient poles, each salient pole comprising a pole body surrounded by at least one coil, the rotor comprising at least a first wedge positioned against the coil of a first salient pole and a second wedge positioned against the coil of a second salient pole consecutive with the first, and in which the clamping of the coils of the first and second salient poles against the pole bodies of the first and second salient poles respectively is performed by moving the first wedge with respect to the second in the inter-pole space along the longitudinal axis of the rotor.

The movement of the first wedge with respect to the second in the inter-pole space may be performed using a tool that allows controlled clamping of the coils of the first and second salient poles against the pole bodies of the first and second salient poles respectively. A pair of wedges and a suitable tool are enough to ensure the functions of holding and controlled pressing of the coils on the rotor. Knowing the angle of the gradient between the wedges and the coefficients of friction of the surfaces in contact with one another, it is easy to determine the force that needs to be applied when tightening the wedges in order to obtain the desired initial clamping pressure on the coils. This pressure is mastered through the relationship there is between the force exerted by the tool and that obtained on the coil.

BRIEF DESCRIPTION OF THE FIGURES

The invention may be better understood from reading the detailed description which will follow, of a nonlimiting exemplary embodiment thereof and from studying the attached drawing, in which.

DETAILED DESCRIPTION OF THE INVENTION

Figure 1:
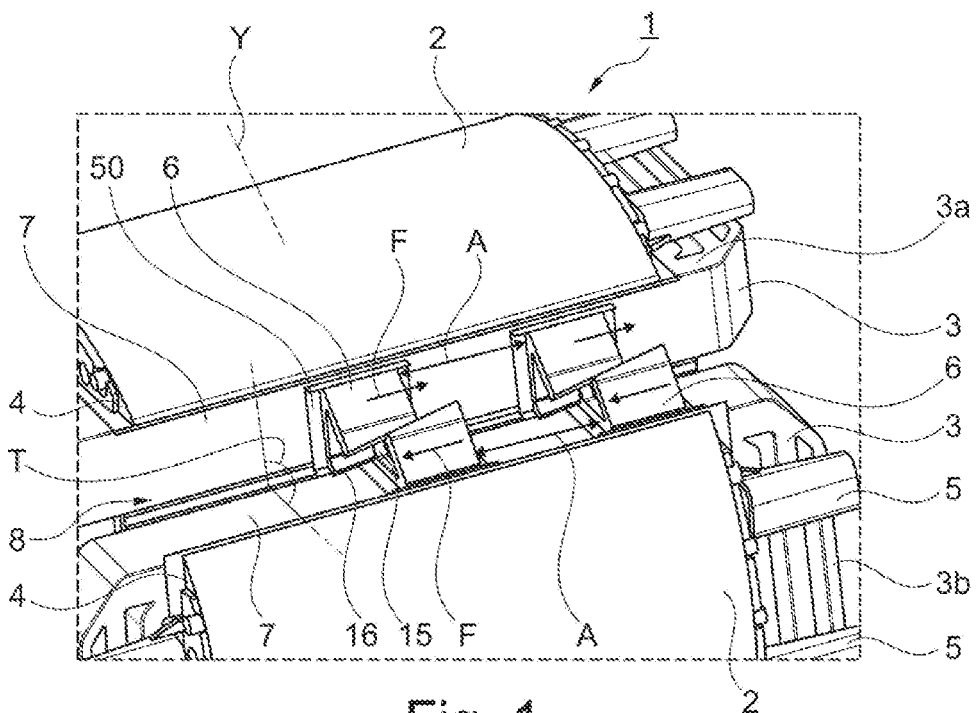
FIG. 1 and FIG. 2 are schematic and partial perspective views of a rotor produced according to the invention, respectively before and after the tightening of the wedges.

FIG. 1 depicts an alternator rotor 1 intended to be rotationally driven, for example at a speed of 1800 rpm, in order to supply a power, for example, comprised between 10 and 2000 kW.

The rotor 1 comprises a magnetic circuit, which may or may not be solid, this magnetic circuit comprising pole cores 2 (also referred to as teeth) each bearing a coil 3 formed by the winding of at least one electric conductor. FIG. 1 depicts just two consecutive salient poles that form part of the magnetic circuit of this rotor 1. These two consecutive poles are angularly offset by an angle of 360°/N, N being the number of poles of the rotor 1. This angle formed between these two consecutive poles corresponds in FIG. 1 to the angle T formed between the two adjacent flanks 7 of two consecutive coils 3 when the rotor 1 is viewed in a plane perpendicular to the longitudinal axis of the rotor 1, which gives T=360°/N, N being the number of poles of the rotor 1.

Each coil 3 comprises two longitudinal portions 3a which extend substantially parallel to the longitudinal axis of the rotor 1 and two transverse portions 3b (also referred to as winding overhangs) which extend substantially perpendicular to the longitudinal axis of the rotor 1.

Each coil 3 has, when viewed along the axis Y, a generally rectangular cross section, the long sides corresponding to the longitudinal portions 3a.

Each pole core 2 is extended, at its radially outer end, by a pole shoe comprising two pole tips 4 extending longitudinally parallel to the axis of rotation of the rotor 1.

When the rotor 1 rotates, centrifugal forces are applied to the longitudinal 3a and transverse 3b portions of the coils 3. The longitudinal portions 3a are retained by the pole tips 4 whereas the transverse portions 3b come to bear against sets of fingers 5.

The rotor 1 has, between two consecutive pole cores 2, an inter-pole space 8.

Wedges 6 in each inter-pole space 8 come to bear respectively against the adjacent flanks 7 of two coils 3 and serve to hold these on the rotor 1.

At least one wedge 6 may bear directly against the corresponding coil 3. There is then direct contact between the wedge 6 and the coil 3.

As an alternative, at least one wedge 6 bears indirectly against the corresponding coil 3. There is then an intermediate element 50 which is placed between the wedge 6 and the coil 3. For example, an electrically insulating material, notably in sheet form, an element that has a thermal role and/or an element with a load-spreading role, are interposed between the wedge 6 and the coil 3.

In the example considered, the number of pairs of wedges 6 distributed along the longitudinal axis of the rotor 1 in each inter-pole space 8 is equal to 2.

This number of pairs of wedges may vary and be comprised for example between 1 and 5 depending on the length of the rotor 1 and the desired level of retention.

The separation A between two pairs of wedges 6 which are present in the one same inter-pole space 8 may be comprised for example between 3 and 8 cm.

FIG. 1 depicts the wedges 6 after they have been mounted in the inter-pole space 8 but before they have been tightened.

The wedges 6 that come to bear against a flank 7 of one coil 3 are able to move with respect to those which come to bear against the flank 7 of the adjacent coil 3 in the direction of the arrows F indicated in FIG. 1. This longitudinal sliding of the wedges 6 of the one same pair of wedges, toward one another, allows them to tighten.

Figure 2:
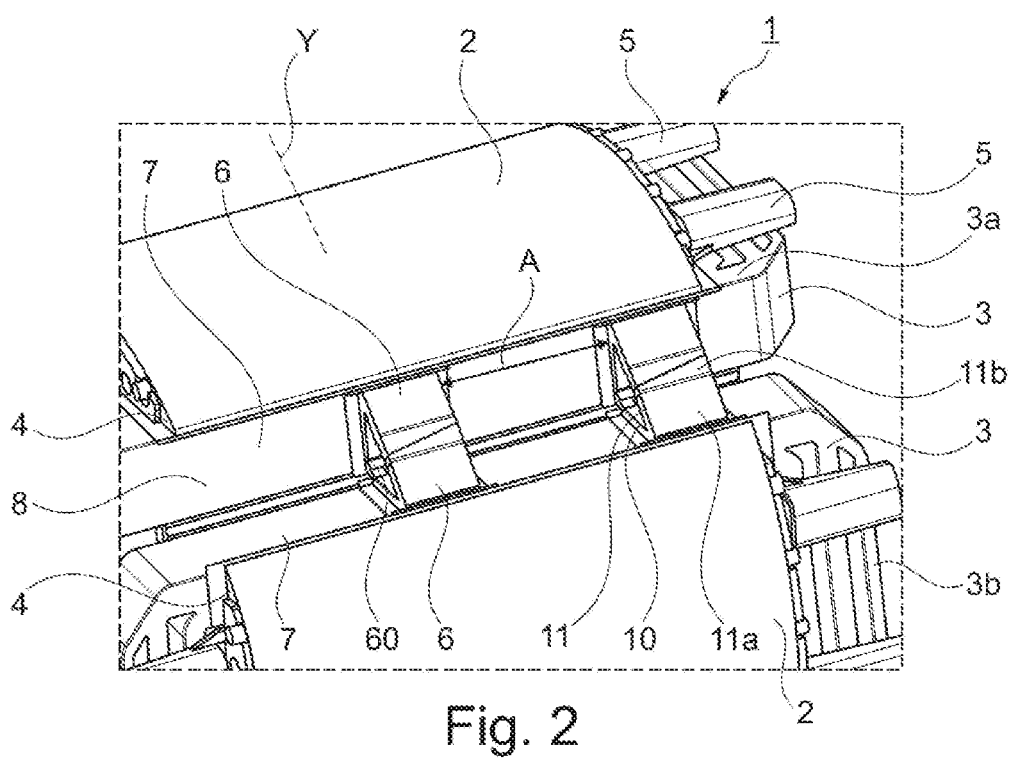

FIG. 2 is a view similar to FIG. 1, after the wedges 6 have been tightened.

As illustrated in FIG. 2, the assembly formed after the tightening of two wedges 6 of a pair may exhibit a channel 60 of which the cross section in a plane perpendicular to the axis of rotation of the rotor 1 may be of triangular overall shape. Air can pass along this channel 60, and this may make it possible to improve the efficiency with which the rotor 1 is cooled as it rotates.

Figure 3:
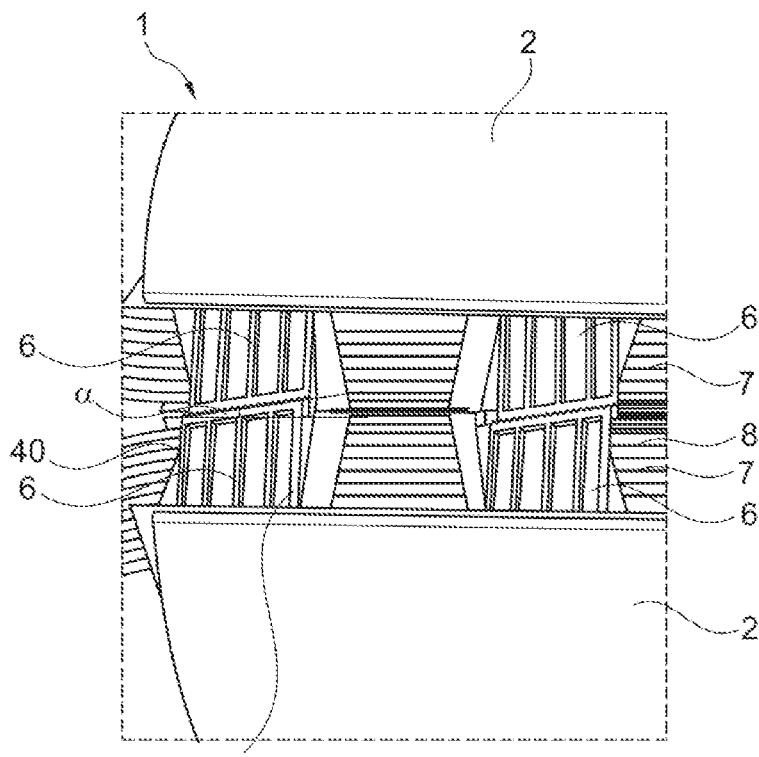
FIG. 3 is a schematic and partial view on an axis perpendicular to the longitudinal axis of the rotor, of one embodiment detail of the rotor in the region of the inter-pole space.

FIG. 3 depicts the rotor 1 along an axis perpendicular to its longitudinal axis comprising two pairs of wedges 6 in the inter-pole space 8 after these wedges have been tightened. Each pair of wedges 6 can be subjected to a movement that is selected according to the level of clamping to be applied locally. Thus, as illustrated in FIG. 3, the relative movement imposed on the wedges 6 of one pair may differ from that imposed on the other pair.

Figure 4:
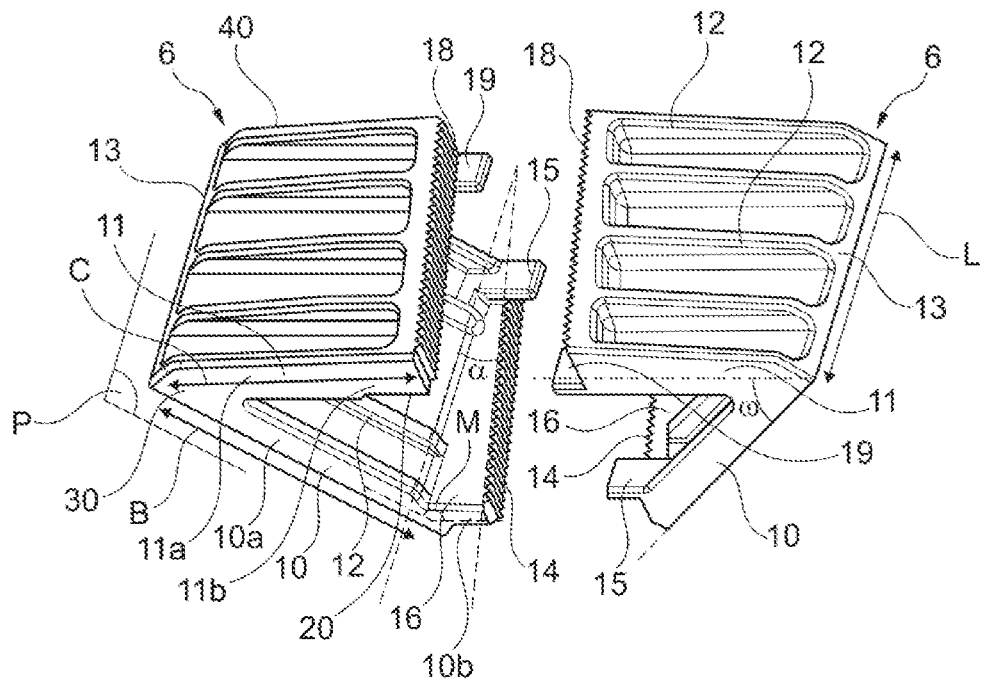
FIG. 4 is a perspective depiction of an example of a pair of wedges according to the invention.

FIG. 4 depicts a pair of wedges 6 which are identical and positioned top to tail before they are mounted in an inter-pole space.

Each wedge 6 comprises an inner part 10 which is configured to press against the flank 7 of a coil 3, and an outer part 11 which extends in the opening between two consecutive salient poles.

The width B of the inner part 10 is comprised for example between 1.5 and 8 cm.

The width C of the inner part 10 is comprised for example between 1 and 5 cm.

The length L of the wedge 6 is comprised for example between 2 and 6 cm.

The inner 10 and outer 11 parts may be ribbed and comprise stiffening ribs 12.

The inner 10 and outer 11 parts meet at an end 13 and form an acute angle ω between them. The ends 13 are intended to bear under the pole tips 4 after the wedges 6 have been mounted in the corresponding inter-pole space.

The angle ω formed between the inner 10 and outer 11 parts at the end 13 of the wedge is substantially equal to half the angle T formed between two consecutive poles, namely ω=(½)×T=(½)×(360°/N), N being the number of poles of the rotor 1. The angle ω is comprised for example between 50 and 10°.

The inner part 10 comprises a body 10a which extends along a plane P and which is extended by a protrusion 10b, the latter having a break in gradient with the plane P at an angle M.

The angle M formed between the plane P and the protrusion 10b is substantially equal to the angle ω. The angle M is comprised for example between 50 and 10°.

The protrusion 10b extends in a chamfered form and at its free end has a contact surface 14 which forms an angle α with the longitudinal axis of the rotor.

The angle α may be smaller than the angle defining the cone of friction for grip of the material of which the wedges 6 are made.

The angle α is comprised for example between 2 and 10°.

The protrusion 10b has an upper surface 16.

The outer part 11 comprises a body 11a comprising a flat 11b which extends parallel to the plane along which the protrusion 10b extends. The flat 11b defines a lower surface 20.

The flat 11b extends in a chamfered shape and at its free end comprises a contact surface 18 which forms an angle α with the longitudinal axis of the rotor.

The contact surfaces 14 and 18 of one wedge 6 are configured to slide respectively on the contact surfaces 14 and 18 of the other wedge 6 of the pair during longitudinal sliding of one wedge 6 with respect to the other.

The contact surfaces 14 and 18 may have a surface finish configured to increase the coefficient of friction, or even to obtain a nonreturn effect. For example, the contact surfaces 14 and 18 have a textured surface or reliefs such as corrugations and/or notches. In order to obtain a nonreturn effect, the contact surfaces 14 and 18 may have nonreturn reliefs comprising an upright flank and an inclined flank. These nonreturn reliefs are configured to allow the wedge 6 to move closer to the other one (in the direction of the arrows F indicated in FIG. 1) but to block their moving apart (in the opposite direction to the arrows F indicated in FIG. 1). Specifically, the upright flanks of the nonreturn reliefs allow the wedge 6 to be blocked relative to the other one.

The inner part 10 may at its free end comprise a collaborating relief 15 which contributes to the guidance of the longitudinal movement of the wedge 6 with respect to the other one independently of the rotor 1. This collaborating relief 15 may, as illustrated in FIG. 4, take the form of a tongue positioned at the end of the protrusion 10b and projecting beyond the contact surface 14. This collaborating relief 15 may slide along the upper face 16 of the protrusion 10b of the other wedge 6 during the longitudinal movement of the wedge 6 with respect to the other one.

Likewise, the outer part 11 may at its free end comprise a collaborating relief 19 which contributes to the guidance of the longitudinal movement of the wedge 6 with respect to the other one independently of the rotor 1. This collaborating relief 19 may, as illustrated in FIG. 4, take the form of a tongue positioned at the end of the flat 11b and protruding beyond the contact surface 18. This collaborating relief 19 may slide along the lower face 20 of the flat 11b of the other wedge 6 during the longitudinal movement of the wedge 6 with respect to the other one.

The collaborating reliefs 15 and 19 of a wedge 6 may be situated on the same side of the wedge 6.

As illustrated in FIG. 1, the wedges 6 are first of all mounted in each inter-pole space 8 in such a way that they bear respectively against the adjacent flanks 7 of two coils 3.

The clamping of the coils 3 against their respective pole bodies is performed by moving the wedges 6 that bear against a flank 7 of one coil 3 with respect to those that bear against the flank 7 of the adjacent coil 3 in the direction of the arrows F indicated in FIG. 1. This relative movement of the wedges 6 of the one same pair along the longitudinal axis of the rotor 1, toward one another, allows them to tighten.

During tightening, the contact surfaces 14 and 18 of the wedge 6 slide respectively over the contact surfaces 14 and 18 of the other wedge 6 of the pair, and the collaborating reliefs 15 and 19 of the wedge 6 slide respectively over the upper face 16 of the protrusion 10b and the lower face 20 of the flat 11b of the other wedge 6 of the pair.

Tightening may be achieved using a tool (not depicted) comprising a pair of jaws, the individual jaws of which bear against the lateral edges 30 and 40 of the wedge 6. The tool can be operated by hand or by an actuating cylinder or using any other suitable movement mechanism.

For example, tightening is performed using at least one torque wrench. A computer may make it possible to calculate the clamping force needed, as a function of the relationship there is between the tightening force applied and the clamping obtained on the coil 3, and halt the relative movement of the wedges 6 of the pair when the desired pressure exerted on the coil 3 is reached.

The clamping force needed is comprised for example between 1000 and 10 000 N.

The tightening as described hereinabove may be performed for each pair of wedges 6 and each inter-pole space 8.

The tightening is performed for example first of all in the central region of the rotor 1 then the pairs of wedges 6 are tightened working in turn toward the axial ends. Tightening is then finalized by once again tightening the pairs of wedges 6 in the central region of the rotor 1, then working once again toward the axial ends. This makes it possible to have relatively uniform clamping of the wedges 6 onto the coils 3.

The method of manufacturing the rotor 1 according to the invention may further comprise at least one finishing step, such as an impregnation step.

Of course, the invention is not restricted to the examples which have just been described.

In particular, the dimensions of the wedges 6 and the separation A between each pair of wedges 6 are adapted to suit the size of the rotor 1.

The expression "comprising a" is to be understood as being synonymous with "comprising at least one", unless specified to the contrary.

The invention claimed is:

1. A rotary electric machine comprising a rotor comprising:
    salient poles, each salient pole comprising a pole body surrounded by at least one coil,
    at least one pair of wedges comprising a first wedge positioned against the coil of a first salient pole and a second wedge positioned against the coil of a second salient pole consecutive with the first,
    the first and second wedges being able to move in an inter-pole space with respect to one another along the longitudinal axis of the rotor, and each having at least one contact surface, the contact surface or surfaces of the first wedge being configured to come into contact with the contact surface or surfaces of the second wedge as one wedge is moved longitudinally with respect to the other in such a way that the movement of one wedge with respect to the other induces a pressing of these wedges against the coils so as to hold the coils of the first and second salient poles respectively against the pole bodies of the first and second salient poles,
    the contact surfaces of the first and second wedges exhibiting gradients with respect to the longitudinal axis of the rotor.

2. The machine according to claim 1, wherein the angle of the gradients with respect to the longitudinal axis of the rotor is less than the angle defining the cone of friction based on the grip of the material of which the wedges are made.

3. The machine according to claim 1, wherein the contact surfaces of the first and second wedges are notched, notably comprising nonreturn reliefs.

4. The machine according to claim 1, wherein the first and second wedges comprise, or consist of, a metallic material, notably aluminum or an aluminum alloy, or an electrically insulating material, notably a thermoplastic or a reinforced thermoplastic.

5. The machine according to claim 1, wherein the machine comprises an electrically insulating material, notably in the form of a thin sheet, placed between the wedges and the coils on which they are positioned.

6. The machine according to claim 1, wherein the first and second wedges each comprise an inner part which is configured to press against the coil and an outer part which extends into the opening between two consecutive salient poles, each said inner and outer parts meeting at one end, forming an angle between them, and the contact surfaces being situated at the free ends of said parts.

7. The machine according to claim 6, wherein each salient pole comprises a pair of pole tips situated on either side of said salient pole, and the end of the wedge being configured to come to bear under the pole tips after the wedges have been mounted in the corresponding inter-pole space.

8. The machine according to claim 6, wherein the inner part comprises a body extending along a plane P and is prolonged by a protrusion that exhibits a break in gradient with the plane P, the protrusion exhibiting an upper surface.

9. The machine according to claim 6, wherein the outer part comprises a body comprising a flat defining a lower surface.

10. The machine according to claim 6, wherein the inner and outer parts are ribbed and comprise stiffening ribs.

11. The machine according to claim 6, wherein the inner and outer parts of one wedge each defines contact surfaces for contact with the other wedge of the pair.

12. The machine according to claim 1, wherein the first and second wedges comprise collaborating reliefs contributing to guiding said first and second wedges in their movement relative to one another.

13. The machine according to claim 12, wherein the collaborating reliefs of one wedge comprise tabs, notably said tabs extending forward of the contact surfaces and positioned to slide on the upper face of the protrusion and the lower face of the flat of the other wedge during the longitudinal movement of the wedge with respect to the other one.

14. The machine according to claim 1, wherein the first and second wedges are identical and positioned top to toe in the inter-pole space.

15. The machine according to claim 1, wherein the machine comprises in each inter-pole space, several pairs of wedges distributed along the longitudinal axis of the rotor.

16. A method for manufacturing a rotor of a rotary electric machine, comprising salient poles, each salient pole comprising a pole body surrounded by at least one coil, the rotor comprising at least a first wedge positioned against the coil of a first salient pole and a second wedge positioned against the coil of a second salient pole consecutive with the first, the first and second wedges each having at least one contact surface, the contact surface of surfaces of the first wedge being configured to come into contact with the contact surface or surfaces of the second wedge as one wedge is moved longitudinally with respect to the other, the contact surfaces of the first and second wedges exhibiting gradients with respect to the longitudinal axis of the rotor, and in which clamping of the coils of the first and second salient poles against the pole bodies of the first and second salient poles respectively is performed by moving the first wedge with respect to the second wedge in an inter-pole space along the longitudinal axis of the rotor.

17. The method according to claim 16, wherein the movement of the first wedge with respect to the second wedge in the inter-pole space is performed using a tool that allows controlled clamping of the coils of the first and second salient poles against the pole bodies of the first and second salient poles respectively.

18. A rotary electric machine comprising a rotor comprising:
- salient poles, each salient pole comprising a pole body surrounded by at least one coil,
- at least one pair of wedges comprising a first wedge positioned against the coil of a first salient pole and a second wedge positioned against the coil of a second salient pole consecutive with the first,
- the first and second wedges being able to move in an inter-pole space with respect to one another along the longitudinal axis of the rotor, and each having at least one contact surface, the contact surface or surfaces of the first wedge being configured to come into contact with the contact surface or surfaces of the second wedge as one wedge is moved longitudinally with respect to the other in such a way that the movement of one wedge with respect to the other induces a pressing of these wedges against the coils so as to hold the coils of the first and second salient poles respectively against the pole bodies of the first and second salient poles,
- the first and second wedges each comprising an inner part which is configured to press against the coil and an outer part which extends into the opening between two consecutive salient poles, each said inner and outer parts meeting at one end, forming an angle between them, and the contact surfaces being situated at the free ends of said parts.

19. A rotary electric machine comprising a rotor comprising:
- salient poles, each salient pole comprising a pole body surrounded by at least one coil,
- at least one pair of wedges comprising a first wedge positioned against the coil of a first salient pole and a second wedge positioned against the coil of a second salient pole consecutive with the first,
- the first and second wedges being able to move in an inter-pole space with respect to one another along the longitudinal axis of the rotor, and each having at least one contact surface, the contact surface or surfaces of the first wedge being configured to come into contact with the contact surface or surfaces of the second wedge as one wedge is moved longitudinally with respect to the other in such a way that the movement of one wedge with respect to the other induces a pressing of these wedges against the coils so as to hold the coils of the first and second salient poles respectively against the pole bodies of the first and second salient poles,
- the first and second wedges being identical and positioned top to toe in the inter-pole space.

20. A rotary electric machine comprising a rotor comprising:
- salient poles, each salient pole comprising a pole body surrounded by at least one coil,
- at least one pair of wedges comprising a first wedge positioned against the coil of a first salient pole and a second wedge positioned against the coil of a second salient pole consecutive with the first,
- the first and second wedges being able to move in an inter-pole space with respect to one another along the longitudinal axis of the rotor, and each having at least one contact surface, the contact surface or surfaces of the first wedge being configured to come into contact with the contact surface or surfaces of the second wedge as one wedge is moved longitudinally with respect to the other in such a way that the movement of one wedge with respect to the other induces a pressing of these wedges against the coils so as to hold the coils of the first and second salient poles respectively against the pole bodies of the first and second salient poles,
the machine comprising in each inter-pole space, several pairs of wedges distributed along the longitudinal axis of the rotor.

* * * * *